United States Patent [19]

Jacob

[11] Patent Number: 5,714,254
[45] Date of Patent: Feb. 3, 1998

[54] LOW VISCOSITY HOT MELT PRESSURE SENSITIVE ADHESIVE COMPOSITIONS

[75] Inventor: Lutz Erich Jacob, Tervuren, Belgium

[73] Assignee: Exxon Chemical Patents Inc., Houston, Tex.

[21] Appl. No.: 864,788

[22] Filed: May 29, 1997

Related U.S. Application Data

[63] Continuation of Ser. No. 718,609, Sep. 23, 1996, abandoned, which is a continuation of Ser. No. 415,264, Apr. 3, 1995, abandoned, which is a continuation-in-part of Ser. No. 345,103, Nov. 28, 1994, abandoned, which is a continuation-in-part of Ser. No. 167,545, Dec. 15, 1993, abandoned.

[51] Int. Cl.$^6$ ............................ C09U 7/02; C08L 9/06
[52] U.S. Cl. .......................... 428/355 BL; 524/474; 524/484; 524/505
[58] Field of Search ........................... 524/505, 484, 524/474, 355 BL; 428/355 BL

[56] References Cited

U.S. PATENT DOCUMENTS

| 4,104,327 | 8/1978 | Inoue et al. ........................... 260/876 B |
| 4,411,954 | 10/1983 | Butch, III et al. ....................... 428/343 |
| 4,623,698 | 11/1986 | Jacob et al. ............................. 525/221 |
| 4,699,941 | 10/1987 | Salerno .................................. 524/308 |
| 5,143,968 | 9/1992 | Diehl et al. ............................. 524/534 |
| 5,183,705 | 2/1993 | Birkholz et al. ......................... 428/343 |

FOREIGN PATENT DOCUMENTS

| 0 318217 A2 | 5/1989 | European Pat. Off. . |
| 0 318217 A3 | 5/1989 | European Pat. Off. . |
| A2-0 318 217 | 5/1989 | European Pat. Off. ........... C09J 3/14 |
| 2289681 A | 11/1995 | United Kingdom . |
| 91/13106 | 9/1991 | WIPO . |
| 93/04135 | 3/1993 | WIPO . |
| 93/17079 A | 9/1993 | WIPO . |
| WO-A-93/17079 | 9/1993 | WIPO . |

OTHER PUBLICATIONS

Encyclopedia of Chemical Technology, (Fourth Edition), 1995, vol. 13, pp. 727–728.

*Primary Examiner*—Ana Woodward
*Attorney, Agent, or Firm*—William G. Muller; John E. Schneider

[57] ABSTRACT

A low melt viscosity, hot melt pressure sensitive adhesive composition having enhanced tack properties is provided. The composition is based on an S-I-S block copolymer having polystyrene and polyisoprene block segments blended with a petroleum tackifier resin which is a blend of a $C_5$–$C_9$ aromatic modified aliphatic petroleum resin and a hydrogenated, alicyclic monomer containing hydrocarbon resin. The composition optionally also includes a polystyrene-polyisoprene diblock copolymer and a processing oil. The composition may be readily applied as solvent-free melt to various substrates using coating die technology because of its low melt viscosity at coating temperatures.

14 Claims, No Drawings

LOW VISCOSITY HOT MELT PRESSURE SENSITIVE ADHESIVE COMPOSITIONS

This is a continuation of application Ser. No. 08/718,609, filed 23 Sep. 1996 which is a continuation of Ser. No. 08/415,264, filed 3 Apr. 1995, which is a CIP of Ser. No. 08/345,103, filed 28 Nov. 1994, which is a CIP of Ser. No. 08/167,545, filed 15 Dec. 1993 all now abandoned.

BACKGROUND OF THE INVENTION

1. Field of the Invention

This invention relates to low viscosity, hot melt, pressure sensitive adhesive compositions which can be applied to substrates as a melt using high speed coating equipment.

2. Description of Related Art

Hot melt pressure sensitive adhesive compositions based on thermoplastic block copolymers derived from a monovinyl aromatic hydrocarbon and a conjugated diolefin mixed with a tackifying resin are well known in the art. Typically such compositions contain a block copolymer of the A-B-A type as a base polymer, wherein A is typically a polymerized styrene block and B is typically a polymerized block of isoprene or butadiene, said copolymer generally having a number average molecular weight in the range of from about 25,000 to about 500,000. Mixtures of these block polymers with appropriate amounts of a tackifier resin, such as a terpene or rosin-type resin, and a processing oil provide compositions which combine good adhesive and cohesive properties, thereby rendering them particularly useful as hot melt pressure sensitive adhesives.

In the earlier-filed, copending U.S. application Ser. No. 08/345,103, abandoned, distinction was made between hot melt pressure sensitive adhesives (HMPSA) compositions in general and those with low enough melt viscosities to be useful for high speed coating applications. The compositions therein comprised mixtures of:

a) 100 parts by weight of a thermoplastic elastomer having the structure $(S-I)_{n-1}S$ wherein S is substantially a polystyrene block, I is substantially a polyisoprene block and n is an integer of from 2 to 10 and wherein the content of polystyrene in said thermoplastic elastomer ranges from about 10 to about 30% by weight and wherein the number average molecular weight of said thermoplastic elastomer ranges from about 50,000 to about 500,000;

b) from about 70 to about 150 parts by weight of a petroleum resin tackifier having a softening point in the range of from about 85° C. to about 105° C., said resin being a Friedel Crafts copolymer comprising:

i) a petroleum feed comprising $C_5$ olefins and $C_5$ diolefins or a mixture of $C_5$ and $C_6$ olefins and diolefins, said feed being obtained from the cracking of petroleum feedstock, copolymerized with ii) from about 5 to 15% by weight, based on component (i), of one or a mixture of monovinyl aromatic compounds having 8–9 carbon atoms;

the composition characterized as having a melt viscosity at 175° C. of less than about 100,000 mPa.s as measured by ASTM-D3236.

Though presenting an optimal solution to the problem of solvent-free HMPSA compositions suitable for high speed coating, the petroleum feedstocks from which the described petroleum resin tackifiers are prepared may vary significantly in availability. This creates conditions of inadequate supply or need to substitute with less optimal tackifying hydrocarbon resins.

SUMMARY OF THE INVENTION

This invention provides an alternative low melt viscosity, solvent free, hot melt pressure sensitive adhesive composition similarly exhibiting excellent cohesive and adhesive strength. The composition comprises a) 100 parts weight elastomeric styrenic block copolymer and b) from about 70 to 150 parts of a hydrocarbon resin tackifier containing i) 10–99 wt. % resin of a $C_5$–$C_9$ aromatic modified aliphatic petroleum resin and ii) 1–90 wt. % resin of a hydrogenated, alicyclic monomer containing hydrocarbon resin. These compositions are suitable for high speed application to substrates used for adhesive tapes, particularly for those adhesive tapes designed for sealing packaging materials. They are particularly suited for adhesive tapes to be used with corrugated cardboard containers.

DETAILED DESCRIPTION OF THE INVENTION

The styrenic block copolymer used as the base elastomer component of the adhesive composition of the invention is that described in the co-pending application and is preferably a triblock copolymer of the formula $(S-I)_{n-1}S$ wherein n=2, i.e., is a linear polymer of the formula S-I-S wherein S is substantially a polystyrene block and I is substantially a polyisoprene block. These block copolymers may be prepared by well known anionic solution polymerization techniques using lithium-type initiators such as disclosed in U.S. Pat. Nos. 3,251,905 and 3,239,478, the complete disclosure of which patents is incorporated herein by reference for purposes of U.S. patent practice.

Preferred styrenic block copolymers have a number average molecular weight (determined by GPC) in the range of from about 50,000 to 500,000, more preferably from about 90,000 to about 250,000, even more preferably 90,000 to 175,000, and most preferably 90,000 to 135,000. These block copolymers contain from about 10 to 30% by weight of polymerized styrene, more preferably from about 15 to 25% by weight polymerized styrene and most preferably from about 16–20% by weight polymerized styrene.

The styrenic block copolymer component may also comprise a blend of two different block thermoplastic elastomers, one having a polystyrene block content of 10–20% by weight and the other having a different polystyrene block content of from 15–35% by weight, blended in a ratio in the range of from about 10:1 to 1:10 parts by weight. The use of two different block copolymers offers the advantages of improved cohesive strength and more precisely tailoring polystyrene content in the preferred target range of from about 15 to 25%, or 16–20% by weight respectively.

Though a pure triblock copolymer is preferred (one having less than 0.1 wt. of diblock polymer) the composition may also contain from about 0.1 to about 10 wt. %, preferably less than or equal to 6 wt. %, most preferably less than 5 wt. % of triblock copolymer of a di-block copolymer having the structure S-I and containing from about 10 to 30% by weight of the polystyrene block. This material may be present as an impurity in the manufacture of the triblock copolymer or may be separately blended with the triblock as a further technique for achieving target polystyrene content or modifying the cohesive properties of the composition.

Preferred number average molecular weight of the di-block copolymer ranges from about 40,000 to about 250,000.

These linear and radial block copolymers are available commercially and are prepared in accordance with methods known in the art. See the disclosures of U.S. Pat. Nos. 5,143,968, 5,292,819 and 5,358,783, each of which is incorporated by reference for purposes of U.S. patent practice.

Particularly preferred block copolymers used in this invention have a melt flow rate in the range of from about 5 to 20 g/10 min, more preferably from about 10 to 18 g/10 min., as measured by ASTM D 1238-82 using condition G (200° C., 5 kg. weight).

The b) i) petroleum resins used as principal tackifier in this invention are the (b) resins of our co-pending application and are prepared by the polymerization of a mixture of a petroleum cracked distillate generally boiling in the range 25° C. to 80° C. and a monovinyl aromatic monomer having 8 or 9 carbon atoms in the proportions to yield a resin containing from 5–15 wt. % of the monovinyl aromatic compound as determined by Nuclear Magnetic Resonance analysis ("NMR"). The petroleum cracked distillate comprises a mixture of saturated and unsaturated monomers, the unsaturated monomers being mono-olefins and diolefins and, although the unsaturated materials are predominantly $C_5$, some higher and lower materials such as C6 olefines and diolefines may be present. The distillate may also contain saturated or aromatic materials which can act as a polymerization solvent.

The preferred monovinyl aromatic monomer is styrene which may be substituted in the aromatic group. Alternatively alpha-methyl styrene or vinyl toluene may be used. It is however, preferred for color reasons to use the pure monomer rather than the commercially available mixtures of vinyl aromatic monomers.

The resins are conveniently prepared by Friedel-Crafts catalyzed polymerization in which the mixture of cracked distillate and monovinyl aromatic monomer are treated with 0.25–2.5 wt. % of a catalyst such as aluminum chloride, aluminum bromide, or solutions, slurries or complexes thereof or borontrifluoride. The polymerization mixture may also include from about 10 to 100 wt % of a chain transfer agent such as a diisobutene oligomer to obtain resins having a narrower molecular weight distribution. These reactions are generally carried out at temperatures in the range 0° to 120° C., preferably 0° to 80° C., more preferably 20° to 55° C., the conditions being controlled to yield a resin of the required softening point. Residual catalyst is quenched by suitable methods such as addition of methyl alcohol and subsequent filtration followed by water and/or caustic washing. The final solution may then be stripped of unreacted hydrocarbons and low molecular weight oils by vacuum or steam distillation.

The most preferred principal tackifier resins have ring and ball softening points in the range of from about 85° C. to about 105° C., more preferably in the range of from about 90° C. to about 100° C. and a content of monovinyl aromatic monomer, e.g., styrene, in the range of about 6–12 wt %.

A particularly preferred principal tackifier for use in the present invention has the following typical properties:

| | |
|---|---|
| Softening Point (°C.) | 92 |
| Gardner Color | 3 |
| Styrene content (NMR) % | 7–10 |
| Mn (number average MW) | 1150 |
| Mw (weight average MW) | 1840 |
| Mw/Mn (molecular weight distribution) | 1.6 |
| Mz (viscosity average MW) | 2800 |

These resins and their method of manufacture are more generally disclosed in U.S. Pat. No. 4,078,132, the complete disclosure of which is incorporated hereby by reference for the purpose of U.S. patent practice.

The b) ii) hydrogenated hydrocarbon resins used as the secondary, or auxiliary, tackifier in this invention are typically those known as cyclopentadiene-dicyclopentadiene (CPD/DCPD) based petroleum resins, aromatic modified aliphatic resins, and $C_9$ aromatic resins. Each can be produced using the Friedel-Crafts polymerization processes referred to above for the principal petroleum resin tackifier. For the CPD/DCPD resins, known thermal polymerization processes are also particularly suitable. After polymerization, this secondary resin is hydrogenated by known methods so as to remove substantially all the residual ethylenic and aromatic unsaturation. "Substantially all" is meant here to include residual ethylenic or aromatic content of less than 10 wt. %, preferably less than 7 wt. %, most preferably less than 5 wt. % (as determined by NMR). For the purposes of this invention the term thermoplastic $C_9$ aromatic resin includes those resins produced from pure monomers such as styrene and alkyl-substituted styrenes which are similarly very reactive towards Friedel-Crafts polymerization catalysts. Additional description appears in the patent literature. See in particular U.S. Pat. Nos. 3,926,878, 4,242,244, 4,276,396, 4,328,090, and 4,629,766, each addressing alicyclic monomer containing resin preparation and/or hydrogenation thereof. Additional description, and reference to principal patent disclosures, for alicyclic monomer containing hydrocarbon resins is presented in "Hydrocarbon Resins", *Kirk-Othmer Encycl. of Chem. Tech.*, v. 13, pages 717–743 (J. Wiley & Sons, 1995). These teachings are incorporated by reference for purposes of U.S. patent practice.

As discussed in the literature, the hydrogenated alicyclic monomer containing hydrocarbon resins may contain other monomers in addition to the CPD/DCPD, $C_9$, and substituted $C_9$ monomers, the other monomers including copolymerizable $C_4$–$C_{10}$ monomers. Preferably the secondary resin tackifier will have a softening point (Ring & Ball, ASTM E-28) ("S.P.") from about 80° C. to 110° C., a weight-average molecular weight ("$M_w$") of about 350–900, a viscosity average molecular weight ("$M_z$") less than about 1600, and a Gardner color less than or equal to about 2. Preferably the S.P. is from 85 to 105, the $M_w$ is from 360 to 700, and the $M_z$ is from 500 to 1200, and the Gardener color is 1 or below.

Commercially available resins suitable as the secondary resin tackifier include the hydrogenated CPD/DCPD Escorez® 5000 series resins 5300 and 5380 of Exxon Chemical Co.; the hydrogenated $C_5/C_9$ Eastotac® H100 resin of Eastman Chemical Co.; the hydrogenated $C_9/C_4$ Regalite® R91 and R101 resins of Hercules, Inc., and the hydrogenated $C_9$ aromatic Arkon® P90 and P100 resins of Arakawa. Such commercial resins are often sold with antioxidant stabilizers present in small amounts.

The quantity of hydrocarbon resin tackifier used in combination with the block copolymer may range from about 70 to about 150 parts by weight per 100 parts by weight of the block copolymer. A more preferred level of addition is in the range of from about 90 to about 125 parts by weight per 100 parts by weight of block copolymer. The hydrocarbon resin preferably is composed of about 25 to about 90 wt. % resin of the b) i) resin and 10 to 75 wt. % resin of the b) ii) resin, and more preferably ranges from about 45 to about 55 wt. % resin of the b) i) resin and 55 to 45 wt. % resin of the b) ii) resin.

The adhesive composition may also include other additives as known in the art such as hydrocarbon extender oils, antioxidants, colorants, fillers and the like.

Suitable extender oils include aromatic, naphthenic or paraffinic oils and mixtures thereof. One of the particular advantages of the invention is that none or only minor amounts of extender oil may be required to achieve good flow and coating characteristics because of the inherently low melt viscosity properties of the adhesive of the invention. Reduction in the level of extender oil required to process the composition tends to result in improved cohesiveness of the adhesive and reduces bleed out of the extender. Where used, the extender oil is added at a level from about 0.5 to about 25 parts by weight per hundred parts by weight of the block copolymer, more preferably from about 5 to 15 parts by weight.

Suitable antioxidants include hindered phenols such as 2,6-di-t-butyl-4-methylphenol; 1,3,5-trimethyl-2,4,6-tris (3', 5'-di-t-butyl-4'-hydroxybenzyl)-benzene; tetrakis [(methylene (3,5-di-t-butyl-4-hydroxyhydroeirmamate)] methane (IRGANOX™ 1010); octadecyl-3,5-di-t-butyl-4-hydroxy cinnamate (IRGANOX™ 1076); and like known materials. Where present, the antioxidant is used at a preferred level of from about 0.05 to about 2 parts by weight per 100 parts by weight of block copolymer.

As indicated above, the components forming the adhesive formulation of the invention have properties such that adhesives having a very low melt viscosity are provided, thereby facilitating flow of the adhesive through the coating apparatus, e.g., coating die, without resorting to the inclusion of solvents or excess extender oil into the composition. Melt viscosities of from about 35,000 to less than about 100,000 milli Pascal second (mPa.s or CPS) measured at 175° C. per ASTM D 3236 can be readily achieved. The more preferred melt viscosity at 175° C. is less than 80,000 m.Pas and the most preferred melt viscosity at 175° C. lies in the range of from about 35,000 to about 50,000 mPa.s.

Highly efficient manufacturing processes are made possible through use of the adhesive formulations of the invention since high speed coating means can be used. For example, the manufacture of oriented polypropylene film based PSA tapes requires coating application speeds of at least 250 m/min. The formulations of the invention are capable of application up to 750 m/min. or more, and the high speed efficiency processes of this invention can utilize preferred coating speeds of 400 m/min. and up.

The components of the adhesive composition may be blended by mixing them using any suitable mixing device at a temperature above the melting point of the components, e.g., at 130° to 180° C. for a period of time sufficient to form a homogeneous mixture, normally 1 to 120 minutes depending on the type of mixing device.

The adhesive composition of the present invention may be applied to a substrate as a melt and then cooled using conventional procedures. The substrate used depends upon the use envisaged but it is usually a relatively thin material, usually no greater than about 3.2 mm in thickness, and in the manufacture of tapes and labels the substrate is a relatively thin sheet material. The sheet material may be a polymeric material which is flexible at room temperature. The sheet material may be a homopolymer of an ethylenically unsaturated monomer such as ethylene, propylene or vinyl chloride, or be polyester or polyamide provided it has sufficient flexibility for the desired end use. Alternatively the substrate may be made from cellulosic or reconstituted cellulosic material such as rayon. The substrate need not be a sheet material but may be composed of fibers which may be woven, or nonwoven as is the case in paper. Woven substrates may be made from cellulosic material, such as cotton or from fibers of any of the above mentioned polymers.

The composition is applied to the substrate using conventional coating techniques such as roller coaters, die coaters and blade coaters, generally at a temperature in the range of from about 150° C. to 200° C. For example, the ready mixed HMPSA heated to the temperature where it will flow readily, usually at temperatures from 170° C. to 190° C., can be applied to a flexible backing by any of know techniques, preferably using a slot die.

A slot die is a closed system where the HMPSA is pumped through by a positive displacement pump. The slot die usually includes a rotating bar at the point of the outlet of the HMPSA in order to obtain a smooth coating surface.

Due to required thin channels inside the die through which the HMPSA has to flow, it is obvious that there are melt viscosity limits for the HMPSA depending on required throughput. Thus one can say that, the higher the coating speed is, the lower the melt viscosity needs to be to obtain consistent and even coating at the desired thickness onto the web.

The substrate should be coated with sufficient composition to provide a dry coat weight from about 10 to about 65 g/cm$^2$. Generally in the manufacture of tapes using a continuous sheet polymeric substrate, a dry coat weight of about 10–30 g/m$^2$ is used. In the manufacture of labels, a dry coat weight from about 10 to 30 g/cm$^2$ is usually used. In the manufacture of masking tape a dry coat weight from about 35 to about 65 g/cm$^2$ is usually used.

After coating, the coated substrate is cut to the required dimension. In the manufacture of tape the substrate is cut into strips and rolled to provide a finished product. The substrate may also be cut into shaped items to provide labels or medicinal tapes.

The following examples are illustrative of the invention. Materials used in preparing the adhesive compositions as identified in the examples are as follows:

| | |
|---|---|
| V4111 - | A linear polystyrene-polyisoprene-polystyrene triblock copolymer (SIS) supplied by Dexco Polymers having a styrene content of 17.5–19.0 % by weight, melt flow rate of 9.7–13.8 g/10 min., a number average mol. wt. of 125,000 ± 2%, and 0 wt. % diblock (SI).[1] |
| DPX 511 - | A linear polystyrene-polyisoprene-polystyrene triblock copolymer (SIS) supplied by Dexco Polymers having a styrene content of 17.5 to 19.0% by weight, melt flow rate of 14.5–17 g/10 min., number average mol. wt. of 110,000 ± 2%, and 0 wt. % diblock (SI).[1] |
| CARIFLEX® TR 1107 - | A polystyrene-polyisoprene-polystyrene triblock copolymer of Shell Chemical being a styrene content of 15 wt. %, diblock (SI) content of 18 wt. %, 0 melt flow rate 9 g/10 min., and number average mol. wt. of 160,000.[1] |
| QUINTACK® 3450 - | A radial polystyrene-polyisoprene-polystyrene from Nippon Zeon having 20 wt. % styrene, 30 wt. % di-block content, melt flow rate of 15 g/10 min., and number average mol. wt. of 180,000.[1] |
| E - 1310 - | Petroleum resin available under the trade name ESCOREZ™ from Exxon Chemical Company and containing about 0.3% by weight of polymerized styrene and having a softening point of about 93.5° C. |
| E - 2203 - | Petroleum resin available under the trade name ESCOREZ™ from Exxon Chemical Company and containing about 8–10% by weight of polymerized styrene, and having a softening point of about 92° C. and a number average molecular weight of about 1150. |
| WINGTACK® | Petroleum resin available from Good Year |

-continued

| | |
|---|---|
| EXTRA - | containing about 6.9% by weight of polymerized styrene and having a softening point of about 99.2° C. |
| FLEXON ® 876 - | A paraffinic extender oil available from Exxon Chemical Company. |
| SI-Diblock - | A polystyrene - polyisoprene di-block copolymer containing about 18% by weight polymerized styrene. |
| ANTIOXIDANT - | IRGANOX ® 1076, a phenolic compound of CIBA GEIGY |
| E-5380 | ESCOREZ ® 5380 of Exxon Chemical Co. having ring and ball s.p. of 85° C. and Mw of 360. |
| E-5300 | ESCOREZ ® 5300 of Exxon Chemical Co. having ring and ball s.p. of 105° C. and Mw of 400. |
| REGALITE ™ R91 | Fully hydrogenated petroleum resin from Hercules Corp. having ring and ball s.p. of 89° C., Mw of 650 and $M_z$ of 900. |
| REGALITE ™ R101 | Fully hydrogenated petroleum resin from Hercules Corp. having ring and ball s.p. of 101° C, $M_w$ of 700 and $M_z$ of 1050. |
| EASTOTAC ™ H100 | Hydrogenated petroleum resin of Eastman Chemical Co. having a ring and ball s.p. of 100° C. |
| ARKON ® P90 | Fully saturated alicyclic hydrocarbon resin of Arakawa having ring and ball s.p. of 90° C. and $M_w$ of 570. |
| ARKON ® P100 | Fully saturated alicyclic hydrocarbon resin of Arakawa having ring and ball s.p. of 100° C. and $M_w$ of 610. |

[1]Note: styrene contents, molecular weights and melt flow rates were measured in accordance with the methods described in U.S. patent 5,143,968.

The various test methods identified in the Tables are as follows:

Ball Tack is measured by Pressure Sensitive Tape Council (PSTC) test 6.

180° Peel Strength is measured by PSTC-1 test.

Loop Tack is measured by the FINAT-9 test.

Viscosity is measured by ASTM D-3236 test.

Hot shear is measured by suspending a 1000 gram weight from a 25 mm wide strip of MYLAR™ polyester film coated with the adhesive formulation which is adhered to a stainless steel plate or corrugated cardboard surface with a contact area of 12.5 mm.×25 mm. The sample is placed in a ventilated oven at 40° C. Time is recorded until stress failure occurs. Typically, these tests are made and recorded individually to determine reliability of the holding power.

Shear Adhesion Failure Temperature (SAFT) is determined by adhering a coated MYLAR strip of 25 mm. width to stainless steel with a contact area of 12.5 mm.×25 mm., hanging the samples in an oven held at 25° C. and suspending a 500 gram weight from the bottom of the strip. The temperature is raised at 0.4C.°/min and the bond failure temperature is measured. The Shear Adhesion Temperature is the average of three tests.

EXAMPLES 1-18

A series of adhesive compositions within and outside the scope of the invention were prepared by mixing ingredients as set forth in Tables 1 and 2 in a two blade mixer at 145° C. for a period of 70 minutes. The compositions were then heated to about 175° C. and the melt was pumped through a coating die onto a 36 micron MYLAR™ polyester film. The dry weight of the applied coating layer ranged from about 19 to 21 g/m². After coating, the tacky side of the film was laminated to a release coated oriented polypropylene film. The film was then wound and cut.

Formulation and physical property data for the various formulations are shown in Tables 1 and 2. The "Reference" example is of a formulation in accordance with copending application U.S. Ser. No. 08/345,103. Formulation blends a–d are for comparative purposes and show adhesive compositions prepared with resins meeting the b ii) description but without the b i) principal resin.

As can be observed from Tables I and II, the blend viscosities are all lower than that of the Reference and thus represent significant benefit for high speed coating. Adhesive properties for this invention are represented best by the ball tack properties. In this test, increased adherence is indicated by decreased distance of travel. Each invention example illustrates a value less than or about 3.5 cm, and for most examples are less than or equal to the 2.5 cm. value achieved by the Reference example. The SAFT values are preferably at a minimum of about 90° C., each invention sample with the exception of Blends 2 and 3 meet this objective, and those blends are sufficiently close to be fully operable. Shear on Cardboard at 40° C. preferably has average values greater than 40 hours and each blend satisfies this criterion.

TABLE 1

| Evaluations and PSA properties: | BLEND 1 | BLEND 2 | BLEND 3 | BLEND 4 | BLEND 5 | BLEND 6 | Reference |
|---|---|---|---|---|---|---|---|
| V4111 | 100 | 100 | 100 | 100 | 100 | 100 | 100 |
| E2203 |  | 12 | 24 | 36 | 60 | 60 | 120 |
| E5380 | 120 | 108 | 96 | 84 | 60 | 60 |  |
| Flexon 876 | 10 | 10 | 10 | 10 | 10 | 10 | 10 |
| Irganox 1076 | 1 | 1 | 1 | 1 | 1 | 1 | 1 |
| 180 peel adhesion (N/cm) (steel) | 5.93 | 6.56 | 6.51 | 5.87 | 6.01 | 6.53 | 7.73 |
| Loop tack (N/25 mm) (steel) | 20.4 | 20.3 | 20.7 | 22.9 | 24.8 | 24.9 | 30.3 |
| Ball tack (cm) | 5.0 | 3.5 | 3.0 | 2.0 | 2.0 | 1.5 | 2.5 |
| Shear on cardboard at RT 12.5 mm * 25 mm · 1 kg (hrs) | >120 | >120 | >120 | >120 | >120 | >120 | >120 |
| Shear on cardboard at 40° C. 12.5 mm * 25 mm · 1 kg (hrs) | >50 | >50 | >50 | >50 | >50 | >50 | 24 h 59' af >50 >50 |
| Saft (deg. C.) 12.5 mm * 25 mm · 0.5 kg (steel) (average) | 88.3 cf 88.3 cf 87.3 cf (88.0) | 88.3 cf 88.8 cf 88.8 cf (88.6) | 89.3 cf 89.3 cf 89.8 cf (89.5) | 89.8 cf 90.8 cf 90.3 cf (90.3) | 93.8 cf 93.3 cf 92.8 cf (93.3) | 94.8 cf 94.3 cf 94.8 cf (94.6) | 99.0 |
| Blend viscosity on 175° C. (after 2 hours) (spindle/rpm) | 54800 (27/2.5) | 52800 (27/2.5) | 52000 (27/2.5) | 53200 (27/2.6) | 55200 (27/2.5) | 59200 (27/2.5) | 83000 (27/1.0) |

|  | BLEND 7 | BLEND 8 | BLEND 9 | BLEND 10 | Reference |
|---|---|---|---|---|---|
| V4111 | 100 | 100 | 100 | 100 | 100 |
| E2203 | 24 | 36 | 60 | 84 | 120 |
| E5300 | 96 | 84 | 60 | 36 |  |
| Flexon 876 | 10 | 10 | 10 | 10 | 10 |
| Irganox 1076 | 1 | 1 | 1 | 1 | 1 |
| 180 peel adhesion (N/cm) (steel) | 7.40 | 7.07 | 7.13 | 6.80 | 7.73 |
| Loop tack (N/25 mm) | 24.2 | 27.3 | 27.8 | 27.3 | 30.3 |
| Ball tack (cm) | 7.5 | 4.5 | 2.0 | 2.0 | 2.5 |
| Shear on cardboard at RT 12.5 mm * 25 mm · 1 kg (hrs) | >120 | >120 | >120 | >120 | >120 |
| Shear on cardboard at 40° C. 12.5 mm * 25 mm · 1 kg (hrs) | >50 | >50 | >50 | >50 | 24 h 59' af >50 >50 |
| Saft (deg. C.) 12.5 mm * 25 mm · 0.5 kg (steel) (average) | 92.8 cf 93.8 cf 93.8 cf (93.5) | 93.8 cf 93.8 cf 92.8 cf (93.5) | 94.8 cf 95.3 cf 95.3 cf (95.1) | 95.8 cf 96.3 cf 95.8 cf (96.0) | 99.0 |
| Blend viscosity at 75° C. (after 2 hours) (spindle/rpm) | 62400 (27/2.5) | 62400 (27/2.6) | 61200 (27/2.5) | 64800 (27/2.5) | 83000 (27/1.0) | notes:
af—adhesive failure; cf—cohesive failure

TABLE II

|  | BLEND a | BLEND b | BLEND 11 | BLEND 12 | BLEND 13 | BLEND 14 | Reference |
|---|---|---|---|---|---|---|---|
| V4111 | 100 | 100 | 100 | 100 | 100 | 100 | 100 |
| E2203 |  |  | 36 | 60 | 36 | 60 | 120 |
| Arkdon P100 | 120 |  | 84 | 60 |  |  |  |
| Arkon P90 |  | 120 |  |  | 84 | 60 |  |
| Flexon 876 | 10 | 10 | 10 | 10 | 10 | 10 | 10 |
| Irganox 1076 | 1 | 1 | 1 | 1 | 1 | 1 | 1 |
| 180 peel adhesion (N/cm) (steel) | 7.96 | 7.13 | 8.60 | 7.87 | 7.27 | 7.00 | 7.73 |
| Loop tack (N/25 mm) | 30.0 | 25.3 | 28.2 | 29.4 | 24.5 | 25.7 | 30.3 |
| Ball tack (cm) | 6.0 | 5.5 | 3.0 | 2.5 | 2.5 | 2.0 | 2.5 |
| Shear on cardboard at RT 12.5 mm * 25 mm · 1 kg (hrs) | >120 | >120 | >120 | >120 | >120 | >120 | >120 |
| Shear on cardboard at 40° C. 12.5 mm * 25 mm · 1 kg (hrs) | >50 | >50 44 h 54' af | >50 | >50 | >50 | >50 | 24 h 59' af >50 >50 |
| Saft (deg. C.) 12.5 mm * 25 mm · 0.5 kg (steel) (average) | 94.1 | 90.5 | 95.8 cf 96.3 cf 95.8 cf (96.0) | 97.2 cf 96.3 cf 96.8 cf (96.8) | 94.8 cf 95.3 cf 95.3 cf (94.8) | 94.8 cf 93.8 cf 94.8 cf (94.5) | 99.0 |
| Blend viscosity at 75° C. (after 2 hours) (spindle/rpm) | 60000 (27/2.6) | 49200 (27/2.5) | 61200 (27/2.5) | 64000 (27/2.5) | 51200 (27/2.6) | 55600 (27/2.5) | 83000 (27/1.0) |

TABLE II-continued

|  | BLEND c | BLEND d | BLEND 15 | BLEND 16 | BLEND 17 | BLEND 18 | Reference |
|---|---|---|---|---|---|---|---|
| V4111 | 100 | 100 | 100 | 100 | 100 | 100 | 100 |
| E2203 |  |  | 36 | 60 | 36 | 60 | 120 |
| Regalite R101 | 120 |  | 84 | 60 |  |  |  |
| Regalite R91 |  | 120 |  |  | 84 | 60 |  |
| Flexon 876 | 10 | 10 | 10 | 10 | 10 | 10 | 10 |
| Irganox 1076 | 1 | 1 | 1 | 1 | 1 | 1 | 1 |
| 180° peel adhesion (N/cm) (steel) | 8.27 | 7.00 | 7.57 | 7.87 | 6.87 | 7.27 | 7.73 |
| Loop tack (N/25 mm) | 29.8 | 25.2 | 27.6 | 26.4 | 24.8 | 24.2 | 30.3 |
| Ball tack (cm) | 7.0 | 3.0 | 2.0 | 2.0 | 2.0 | 2.0 | 2.5 |
| Shear on cardboard at RT 12.5 mm * 25 mm - 1 kg (hrs) | >120 | >120 | >120 | >120 | >120 | >120 | >120 |
| Shear on cardboard at 40° C. 12.5 mm * 25 mm - 1 kg (hrs) | >50 | >50 | >50 | >50 | >50 | >50 | 24 h 59' af >50 >50 |
| Saft (deg. C.) 12.5 mm * 25 mm - 0.5 kg (steel) (average) | 92.6 | 90.6 | 95.3 cf 95.3 cf 95.3 cf (95.3) | 95.8 cf 95.8 cf 94.3 cf (95.3) | 91.3 cf 92.3 cf 91.8 cf (91.8) | 91.3 cf 92.3 cf 90.8 cf (91.5) | 99.0 |
| Blend viscosity at 175° C. (after 2 hrs) (spindle/rpm) | 51500 (27/2.5) | 45700 (27/2.5) | 49600 (27/2.5) | 58400 (27/2.6) | 46800 (27/2.5) | 50800 (27/2.5) | 83000 (27/1.0) |

As illustrated above, the balance of properties sought for high speed coating application are readily met by the blend compositions of the invention. Sufficiently low melt viscosities are achieved while both tack and adhesion properties are at least retained or improved.

I claim:

1. A hot melt pressure sensitive adhesive composition comprising a mixture of:
   a) 100 parts by weight of a linear styrenic block copolymer having the structure $(S-I)_{n-1}$ S wherein S is a polystyrene block, I is a polyisoprene block and n is an integer of from 2 to 10 and wherein the content of polystyrene in said styrenic block copolymer ranges from about 10 to about 20% by weight and wherein the number average molecular weight of said styrenic block copolymer ranges from about 50,000 to about 175,000, said styrenic block copolymer containing less than 0.1 weight percent diblock S-I;
   b) from about 70 to about 150 parts by weight of a hydrocarbon tackifier resin comprising:
      i) 25–99 wt. % resin of a $C_5$ to $C_9$ aromatic modified aliphatic petroleum resin; and
      ii) 1–75 wt. % of a hydrogenated, alicyclic monomer containing hydrocarbon resin
   said composition characterized as having a melt viscosity at 175° C. of from about 35,000 to less than about 100,000 mPa.s.

2. The composition of claim 1, wherein n is 2.

3. The composition of claim 2, further containing from about 0.5 to about 25 parts by weight of an aromatic, naphthenic or paraffinic extender oil.

4. The composition of claim 2, wherein said b) i) aromatic modified aliphatic petroleum resin comprises monovinylaromatic compound styrene as the aromatic monomer modifier.

5. The composition of claim 2, wherein said styrenic block copolymer comprises a blend of at least two different block copolymers, one having a polystyrene block content of from about 10 to about 20% by weight and another having a different polystyrene block content of from about 15 to about 35% by weight.

6. The composition of claim 2, further containing from about 0.05 to about 2 parts by weight of an antioxidant.

7. The composition of claim 2, wherein said styrenic block copolymer has a number average molecular weight in the range of from about 90,000 to about 250,000.

8. The composition of claim 2, wherein said hydrocarbon tackifier resin is present at a level of from about 90 to about 125 parts by weight.

9. The composition of claim 2, wherein said b) i) hydrocarbon resin has a softening point in the range of from 90° C. to 100° C. and a content of monovinyl aromatic monomer in the range of about 6 to 12% by weight.

10. The composition of claim 9, wherein said b) ii) hydrogenated, alicyclic monomer containing hydrocarbon resin has a softening point (ring and ball) of about 80° C. to about 110° C., a $M_w$ of about 350–900, and $M_z$ less than about 1600.

11. The composition of claim 10, wherein said b) ii) hydrocarbon resin is a hydrogenated cyclopentadiene/dicyclopentadiene petroleum resin.

12. The composition of claim 2, wherein said b) hydrocarbon tackifier resin contains 45 to 55 wt. % resin of the b) i) resin and 55 to 45 wt. % resin of the b) ii) resin.

13. A process for preparing an adhesive tape comprising:
   a) heating the hot melt pressure sensitive adhesive composition of claim 1 to a temperature in the range of from about 150° C. to about 200° C.;
   b) applying a thin coating of said melt to the surface of a tape substrate at a speed greater than or equal to 400 m/min. to form a coated substrate; and
   c) cooling said coated substrate.

14. An adhesive tape comprising a tape substrate having the adhesive composition of claim 1 applied to one surface thereof at a dry coat weight in the range of from about 10 to 65 g/cm$^2$.

* * * * *